United States Patent [19]

Beiswenger

[11] Patent Number: 5,579,035
[45] Date of Patent: *Nov. 26, 1996

[54] LIQUID CRYSTAL DISPLAY MODULE

[75] Inventor: John L. Beiswenger, Coatesville, Pa.

[73] Assignee: Technomarket, L.P., Chicago, Ill.

[ * ] Notice: The portion of the term of this patent subsequent to Sep. 25, 2007, has been disclaimed.

[21] Appl. No.: 726,270

[22] Filed: Jul. 5, 1991

[51] Int. Cl.$^6$ .................................................. G09G 5/00
[52] U.S. Cl. ......................... 345/169; 345/175; 345/206; 359/48
[58] Field of Search .................................. 340/712, 718, 340/719, 765, 784; 359/48, 49, 64, 83; 341/31; 362/32; 361/399; 248/917; 345/169, 175, 206

[56] References Cited

U.S. PATENT DOCUMENTS

| | | |
|---|---|---|
| Re. 28,042 | 6/1974 | Rhodenizer et al. . |
| 3,056,030 | 9/1962 | Kelchner . |
| 3,372,789 | 3/1968 | Thiele et al. . |
| 3,373,287 | 3/1968 | Holzer . |
| 3,398,290 | 8/1968 | Basehore et al. . |
| 3,526,775 | 9/1970 | Friedrich et al. . |
| 3,673,327 | 6/1972 | Johnson et al. . |
| 3,712,047 | 1/1973 | Girard ...................................... 359/48 |
| 3,885,408 | 5/1975 | Clark, Jr. . |
| 3,956,745 | 5/1976 | Ellis . |
| 4,025,162 | 5/1977 | Yagi . |

(List continued on next page.)

FOREIGN PATENT DOCUMENTS 2028427  5/1981  United Kingdom .

OTHER PUBLICATIONS

Cummings, T. F. "Transparent Keyless Keyboard For Variable Terminal Applications." *IBM Tech Disclosure Bulletin* (Sep. 1977).

Article by T. J. Scheffer entitled New Multicolor Liquid Crystal Displays That Use a Twisted Nematic Electro-Optical Cell from J. Appl. Phys., vol. 44, No. 11, Nov., 1973, pp. 4799-4803.

Article of I. A. Shanks entitled Electro-Optical Colour-Effects By Twisted Nematic Liquid Crystal—Electronics Letters 4th Apr., 1974 vol. 10 No. 7, pp. 90-91.

A brouchure by Gerald M. Murch—Tektronix, Inc. entitled The Effective Use of Color and Display Technology, Sep., 1984.

(List continued on next page.)

*Primary Examiner*—Richard Hjerpe
*Assistant Examiner*—Kara Farnandez
*Attorney, Agent, or Firm*—Gerstman, Ellis & McMillin, Ltd.

[57] ABSTRACT

A liquid crystal display module comprises a liquid crystal display and a housing which carries the display, typically of C-shaped cross section with the liquid crystal display being attached to opposed ends of the C-shaped cross section of the housing. A conductor carried by the housing provides electronic communication between electronic circuitry and the liquid crystal display. A pair of light pipes are respectively positioned adjacent opposed edges of the housing, a first of the light pipes being connected to a source of light and the other of the light pipes being connected to a sensor for the light. The light pipes each define spaced branches positioned so that spaced light beams can be emitted from the branches of the first light pipe to pass through the liquid crystal display and to be received by the other light pipe through the branches thereof, to be sensed by the sensor. Control means are capable of sequentially and transiently forming transparent and opaque windows in the liquid crystal display at positions where the spaced light beams pass through the liquid crystal display. Timer and logic circuitry are provided for correlating a signal received from the sensor with an individual light beam that creates a signal. Thus, occlusion of at least one of the spaced light beams with a finger or the like causes a specific, characteristic response by the timer and logic circuitry to provide electronic choices by simple positioning of the finger in the manner of an electronic switch.

24 Claims, 3 Drawing Sheets

U.S. PATENT DOCUMENTS

| | | |
|---|---|---|
| 4,196,227 | 4/1980 | DuBois et al. . |
| 4,224,615 | 9/1990 | Penz . |
| 4,247,767 | 1/1981 | O'Brien et al. . |
| 4,247,928 | 1/1981 | Dorfman . |
| 4,267,443 | 5/1981 | Carroll et al. . |
| 4,286,051 | 8/1981 | Wagner . |
| 4,329,581 | 5/1982 | Helfrich, Jr. et al. . |
| 4,340,813 | 7/1982 | Sauer . |
| 4,386,826 | 6/1983 | Stolov . |
| 4,386,836 | 6/1983 | Aoki et al. . |
| 4,387,367 | 6/1983 | Fisher . |
| 4,474,432 | 10/1984 | Takamatsu et al. . |
| 4,506,956 | 3/1985 | Dir . |
| 4,514,042 | 4/1985 | Nukii et al. . |
| 4,566,758 | 1/1986 | Bos . |
| 4,582,396 | 4/1986 | Bos et al. . |
| 4,610,507 | 9/1986 | Kamamori et al. . |
| 4,611,889 | 9/1986 | Buzak . |
| 4,626,074 | 12/1986 | Crossland et al. .......... 359/48 |
| 4,635,051 | 1/1987 | Bos et al. . |
| 4,649,381 | 3/1987 | Masuda et al. . |
| 4,652,087 | 3/1987 | Bos et al. . |
| 4,670,744 | 6/1987 | Buzak . |
| 4,684,974 | 8/1987 | Matsunaga ............... 340/718 |
| 4,690,510 | 9/1987 | Takamatsu et al. . |
| 4,690,833 | 9/1987 | Donson et al. . |
| 4,727,285 | 2/1988 | Taniguchi . |
| 4,755,035 | 7/1988 | Kopish et al. . |
| 4,766,424 | 8/1988 | Adler ....................... 340/712 |
| 4,770,499 | 9/1988 | Kobayashi et al. . |
| 4,772,100 | 9/1988 | Suenaga . |
| 4,796,977 | 1/1989 | Drake . |
| 4,834,503 | 5/1989 | Tsujimoto et al. ............. 340/784 |
| 4,836,651 | 6/1989 | Anderson . |
| 4,839,558 | 6/1989 | Mierzwinski ................ 340/719 |
| 4,847,606 | 7/1989 | Beiswenger ................ 340/712 |
| 4,862,153 | 8/1989 | Nakatani et al. . |
| 4,951,035 | 8/1990 | Beiswenger . |
| 4,958,911 | 9/1990 | Beiswenger et al. ............ 359/48 |
| 4,990,901 | 2/1991 | Beiswenger . |

OTHER PUBLICATIONS

Brochure by Mike Vance of Tektronix, Inc. entitled A Field–Sequential Color Graphics System Using the Liquid Crystal Shutter dated Sep., 1984.

IBM Technical Disclosure Bulletin entitled "Optical Data Input Device" by D. D. Baumann et al., vol. 11 No. 10, Mar. 1969, pp. 1281 and 1282.

IBM Technical Disclosure Bulletin entitled "Finger Position Detect Method" by D. R. Thompson, vol. 23 No. 7B, Dec., 1980, p. 3289.

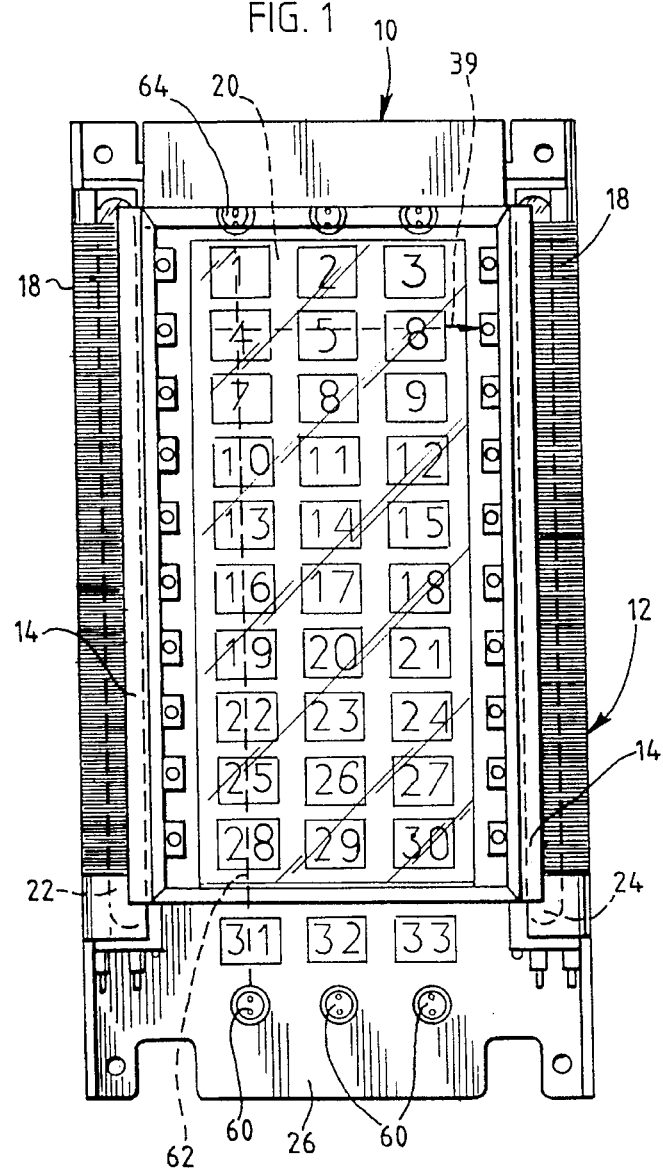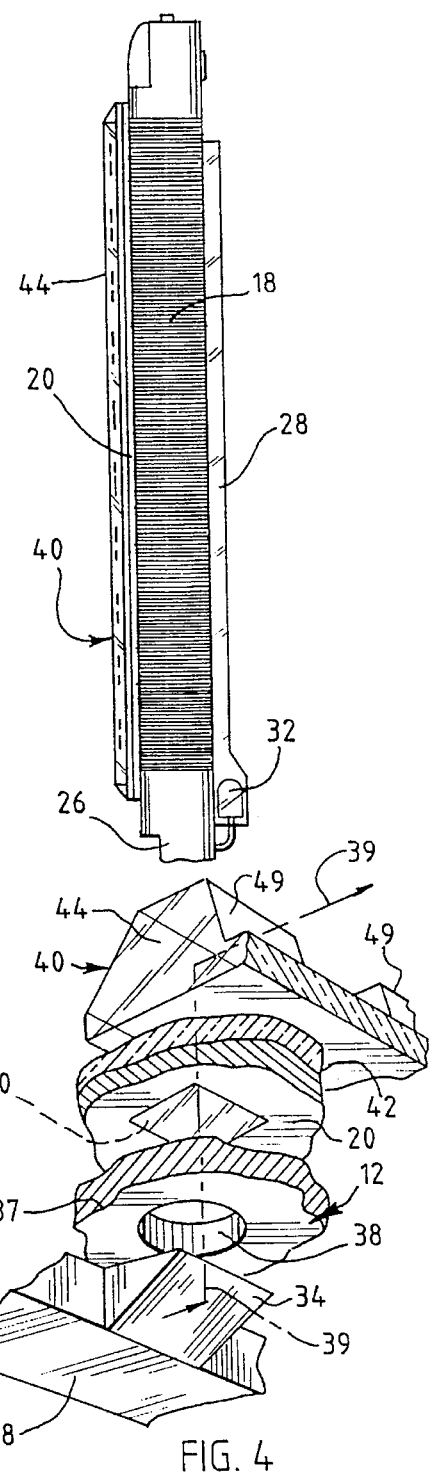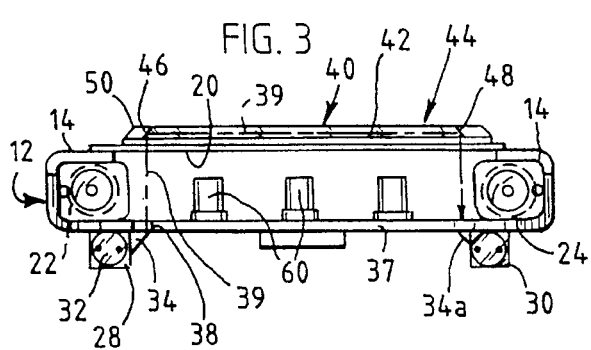

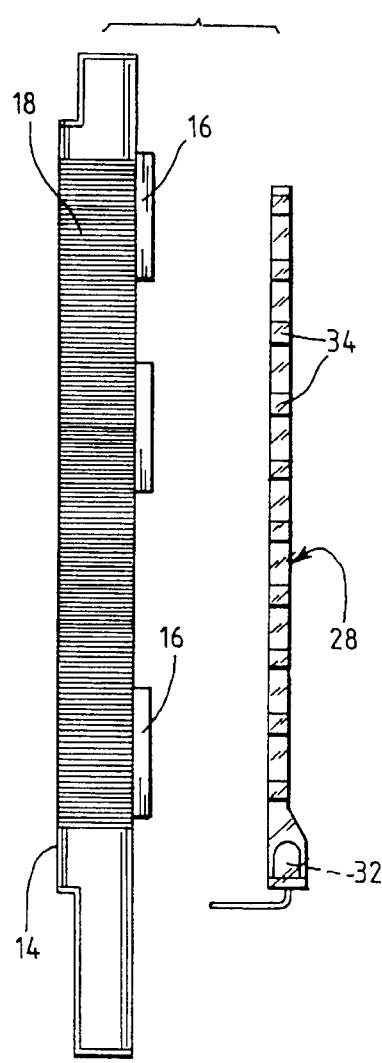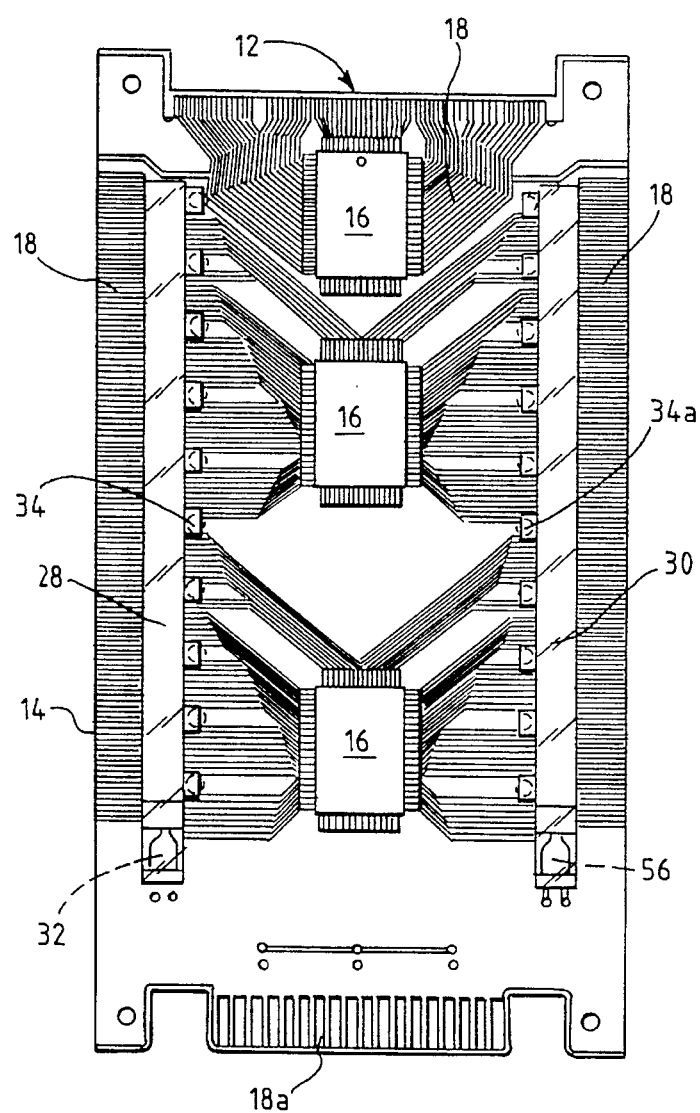

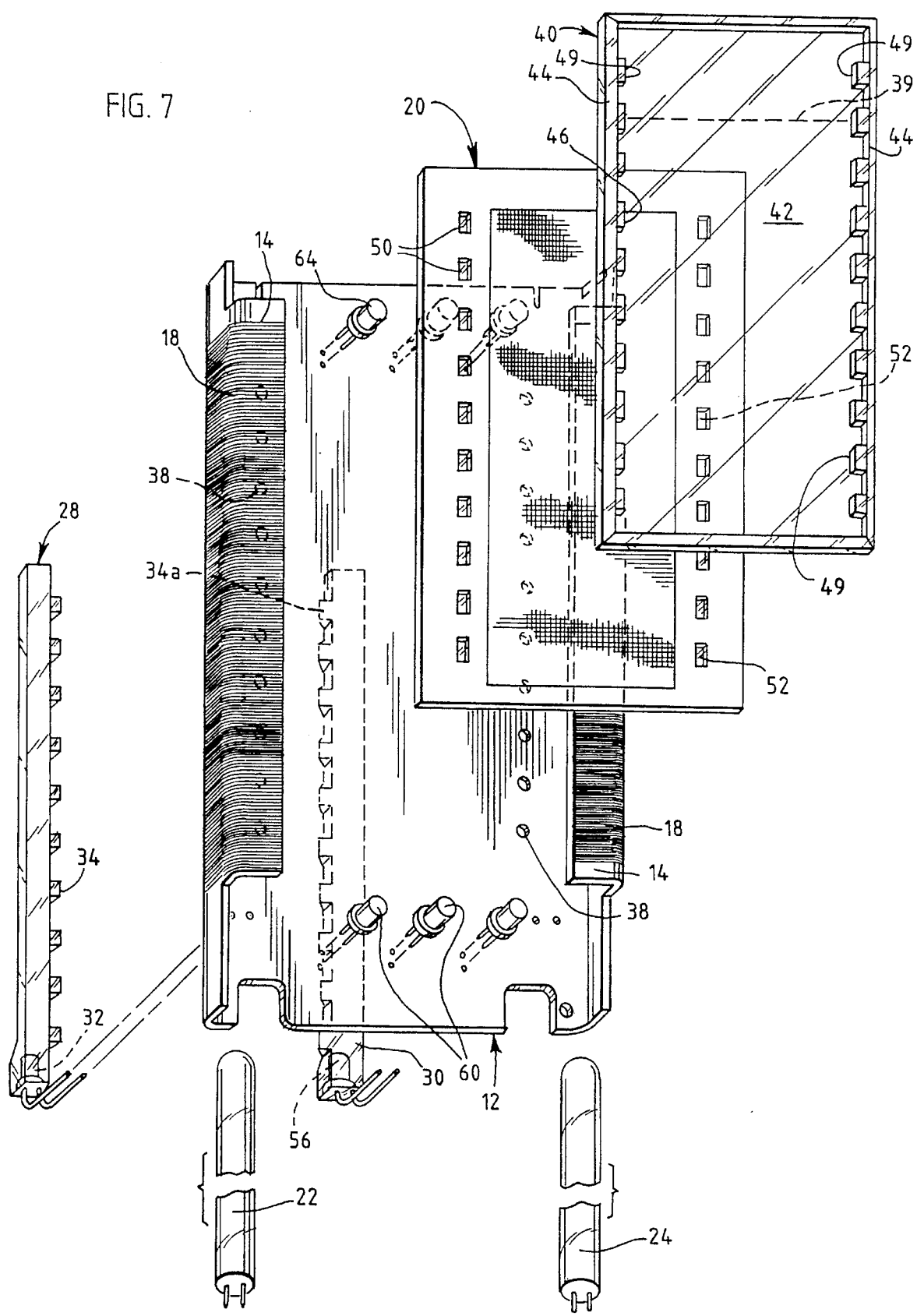

LIQUID CRYSTAL DISPLAY MODULE

BACKGROUND OF THE INVENTION

In Beiswenger U.S. Pat. No. 4,847,606, issued Jul. 11, 1989, a control and display system is provided including a liquid crystal display panel, a light source, and a light detector. Light from the source is directed through the liquid crystal display panel to the light detector, so that the liquid crystal display panel can serve as a gate to either permit passage of the light or to prevent such passage, by means of the electronic circuitry to which the liquid crystal display panel is connected. A control circuit is provided for holding the gating portion of the liquid crystal display panel in generally opaque condition, while preferably sequentially and momentarily clarifying segments of the panel portion. Thus, momentary, sequential, transversely spaced light beams may be generated between the light source and the light detector. A timer and logic circuit is provided for correlating signals received from the light detector with generated, individual, spaced light beams that create the signals.

Accordingly, occlusion of at least one of the individual light beams with an opaque member causes a specific characteristic response by the timer and logic circuit. In other words, when one of the individual light beams is occluded, the timer and logic circuit recognizes this and emits a characteristic signal which might activate a relay, send an instruction to a microprocessor, or cause some other action.

Thus, an electronic switch is provided without moving parts, which is actuated by the desired positioning of a finger or the like to block one of the timed, momentary beams that pass through the liquid crystal display.

In Beiswenger et al. U.S. Pat. No. 4,958,911, issued Sep. 25, 1990, a different type of liquid crystal display module is disclosed, utilizing a housing of C-shaped cross section which carries a liquid crystal display panel, to support and protect the panel and interior elements. The display module may contain interior lighting for back lighting of the liquid crystal display panel. Also, as disclosed in the patent, the module may exhibit a software-variable color display through the use of one or more white or different color light sources and color polarizers so that a multicolor liquid crystal display module may be provided. Additionally, the housing may carry printed circuitry extending between the electronics of the system and the liquid crystal display panel.

By this present invention, apparatus is provided which incorporates features and advantages of the above two patents in a novel and unique manner, to provide a liquid crystal display module which may operate as an electronic switch without moving parts by the occlusion of light beams. At the same time, the display module may exhibit a brightly backlit liquid crystal display, which may be multicolored if desired, and which identifies locations on the liquid crystal display which correspond to switching sites. These locations may change from time to time, as governed by software and optionally depending upon prior switching decisions. The desirable, bright, optionally multicolored display may be correlated with the timed, transverse beams passing across the face of the liquid crystal display which may be occluded by the finger or other opaque object to designate switching choices.

The apparatus of this invention is relatively simple, durable, and of low cost, while exhibiting great flexibility of use that is limited essentially only by the nature of the software that operates the combined switch and backlit liquid crystal display module.

DESCRIPTION OF THE INVENTION

In accordance with this invention, a liquid crystal display module is provided which comprises a liquid crystal display, which is typically a flat plate of generally conventional design. A housing is provided, the housing being typically of an essentially C-shaped cross section. The liquid crystal display is attached to the housing, typically to opposed ends of the C-shaped cross-section of the housing. Electronic control means are positioned on the housing, and conductor means are typically carried by the housing, to provide electronic communication between the electronic control means and the liquid crystal display. Typically, the conductor means can be printed on the surface of the housing in accordance with conventional printed circuitry technology.

Preferably, at least some of the electronic control means, such as drivers for the liquid crystal display, are carried on the side of the housing which is opposed to the liquid crystal display. At least part of the conductor means extends about an outer, curved surface portion of the housing which is defined by the C-shaped cross section. Typically, the liquid crystal display is attached to the housing at opposed edges of the plate which comprises the display.

It is also preferable for a light source to be carried within the C-shaped cross section of the housing, the light source comprising at least one light bulb and preferably two light bulbs of differing color, to provide back illumination of the liquid crystal display. The specific technology of the use of two light bulbs of differing color is disclosed in the above-cited U.S. Pat. No. 4,958,911, the disclosures of which are incorporated herein by reference.

The C-shaped housing may, if desired, be made of plastic which is extruded in the C-shaped cross section, or the plastic may be initially a flat sheet upon which printed circuit lines are placed, with the housing then being formed by thermoforming or a similar process into the preferred C-shape. Preferably, the housing is made of a substantially rigid material to provide protection and support to the liquid crystal display, while the conductive circuit lines carried on the housing and the liquid crystal display are electrically connected by means of an electrically conductive adhesive.

Additionally, the C-shaped housing defines a projection on an edge of the housing that extends parallel to the C-shaped cross-section of the housing. Some of the conductor means are carried on the projection, to define an edge connector for connection of the conductor means and the liquid crystal display to other circuitry.

More specifically, the liquid crystal display may be attached at the two opposed ends of the C-shaped cross section of the housing. Electronic means are carried by the housing for providing electronic communication between electronic control means and the liquid crystal display.

A pair of light pipes are respectively positioned adjacent to opposed edges of the housing. A first of the light pipes is connected to a source of light, preferably infrared radiation although any other desired type of light may be used including ultraviolet radiation or visible light of any desired color or colors. The other of the set of light pipes is connected to a sensor for the light that is used. The light pipes each define a plurality of spaced branches positioned whereby a plurality of spaced light beams can be emitted from the branches of the first light pipe, and can pass through the liquid crystal display, and then can be received by the other light pipe through its branches to be sensed by the sensor. Preferably, the light pipes are substantially covered with an internally reflective surface such as aluminum except at ends of the spaced branches, and as necessary for passage of the light from the light source and to the sensor.

The control means are capable of sequentially and transiently forming transparent and opaque windows in the liquid crystal display at positions where the spaced light beams can pass through the liquid crystal display. Specifics of this are disclosed in the previously cited U.S. Pat. No. 4,847,606, the disclosure of which is incorporated by reference herein. Timer and logic means are also provided for correlating a signal received from the light sensor with the individual light beam that creates the signal, in a manner discussed in the previously cited patent. Thus, occlusion of at least one of the spaced light beams with an opaque member is noted by the system, and causes a specific, characteristic response by the timer and logic means which may be utilized to perform a switching function. This switching function can be highly variable in nature, as governed by software, to provide a switch having great utility and flexibility of use.

Preferably the branches of the light pipes are positioned transversely of the liquid crystal display, to facilitate the passage of the light beam, which is preferably infrared radiation, through the liquid crystal display when such passage is permitted because the liquid crystal display gate portion is transparent.

Additionally, a transparent plate may be carried on the side of the liquid crystal display opposite to the side upon which the light pipes are carried. The transparent plate preferably carries pairs of spaced 90° reflector members, one pair for each light beam, the members being positioned to direct each spaced light beam from the first light pipe through two angled reflections along a light path that enters a respective branch of the other light pipe. The reflector members direct the spaced light beams along paths portions of which are outside of the plate to permit occlusion of the spaced light beams by a finger or other opaque object.

Additionally, the module of this invention preferably comprises at least one light bulb, typically carried within the C-shaped cross-section of the housing to provide back illumination of the liquid crystal display. This second light source, which may include a pair of light bulbs of different color, provides a different type of light from the light provided to the light pipes, preferably visible light. The sensor described above is preferably insensitive to this different type of light. Thus, the sensor is responsive only to the light that passes through the light pipes, and not any light from the second light source or room light Additionally, added light emitter and receptor means may be provided, typically of a type of light similar that found in the respective light pipes described above. The added receptor means is connected to the timer and logic means, with the added light emitter and receptor means being provided to emit and receive at least one second light beam, and preferably a plurality of second, spaced light beams, that cross the previously described spaced light beams in a position permitting simultaneous occlusion of both a spaced light beam and a second light beam with the same opaque member. See Beiswenger U.S. Pat. No. 4,951,035, issued Aug. 21, 1990. As a result of this, two dimensional locating of the opaque member adjacent the liquid crystal display may be provided. Accordingly, a two dimensional matrix of switching choices may be provided, with any one of the choices being activated by simply touching the area with the finger to occlude selected, crossing light beams.

DESCRIPTION OF THE DRAWINGS

FIG. 1 is a front plan view of the liquid crystal display module of this invention;

FIG. 2 is a side elevational view of the module of FIG. 1;

FIG. 3 is an end elevational view of the module of FIG. 1;

FIG. 4 is a fragmentary, exploded, perspective, view of components of FIG. 1;

FIG. 5 is a fragmentary, exploded, side elevational view of components of the module of FIG. 1;

FIG. 6 is a plan view of the opposite side of the module of FIG. 1; and

FIG. 7 is an exploded perspective view of major components of the module of FIG. 1.

DESCRIPTION OF SPECIFIC EMBODIMENTS

Referring to the drawings, liquid crystal display module 10 comprises a housing 12 which may be made of substantially rigid plastic, and which may be of generally C-shaped cross section, with C-shaped side areas 14 being shown particularly FIGS. 3 and 7.

Housing 12 defines a front face as shown in FIG. 1 with side arms 14 displayed. Housing 12 also defines a back side as shown in FIG. 6 upon which various electronic components such as drivers 16 for a liquid crystal display plate or the like may be carried. A large number of printed circuit lines 18 may be carried on the back side of housing 12, connecting at one end with the drivers 16 and extending outwardly and around the outer surface of the C-shaped cross sectional arms 14, to enter into electrical communication with liquid crystal display plate 20, which plate may be carried at its sides by the outer edges of arms 14, as shown particularly in FIG. 3. Liquid crystal display 20 may be sealed to arms 14 by an electrically conductive adhesive to facilitate the electrical connection between printed circuit lines 18 and printed circuit lines or traces on liquid crystal display 20.

The curved C-shaped arms 14 provide a pair of compartments which may receive a pair of fluorescent lights 22, 24, with each light being preferably of a different color to provide the desired color display in the manner disclosed in Beiswenger, et al. U.S. Pat. No. 4,958,911. The various plate components necessary for such color display are all indicated by liquid crystal display 20. Light bulbs 22, 24 thus provide back illumination to liquid crystal display 20 so that the display is prominent and bright even in a darkened room.

C-shaped housing 12 also defines a projection 26 on the edge of housing 12 that extends parallel to the C-shaped cross section, the plane of such cross section being illustrated in FIG. 3. Some of the printed circuitry conductor means may be carried on projection 26, so that projection 26 defines an edge connector 18a for connection of the printed circuitry conductor means 18 and liquid crystal display module to other circuitry.

By this invention, a pair of transparent light pipes 28, 30 are secured to the rear side of housing 12 as particularly shown in FIGS. 2, 3 and 6. One of the light pipes, specifically light pipe 28, carries at one end thereof a source of infrared radiation 32, or any other radiation preferably different from the radiation of lights 22, 24 so that a sensor may be used that is not affected by lights 22, 24. The infrared radiation when emitted, extends the length of light pipe 28, which light pipe is aluminized on most of its surface area to provide a maximum amount of internal reflection for the radiation. However, light pipe 28 defines a plurality of branches 34, each of which defines a open, light transmissive face to allow infrared radiation to pass out of light pipe 28 at each branch 34 in a direction substantially perpendicular to the adjacent wall of housing 12. An aperture 38 is formed at that point of wall 37 of housing 12, to cause a beam 39 of infrared radiation to pass upwardly through the housing from each of branches 34. The infrared beams are capable of intersecting liquid crystal display 20 and passing through it if and when the liquid crystal display is clear at that point.

A transparent frame 40 is provided, abutting liquid crystal display 20 at its outer surface and carried thereon to protect liquid crystal display 20. Frame 40 comprises a sheet of transparent plastic 42 fitting over the liquid crystal display 20, with sheet 42 being surrounded by an outwardly facing rectangular ridge 44. The outer, angular surface of ridge 44 is typically formed in frame 40 to serve as a prism-like means for deflecting the respective infrared beams 39 through two 90 degree angles, as particularly shown in FIG. 3 at points 46, 48 in ridge 44. Between each ridge 44 beam 39 passes outside of liquid crystal display module 10 so that one can simply touch the flat plastic plate 42 of frame 40 to occlude any or all of infrared beams 39.

Thus, each infrared beam 39 is emitted by infrared emitter 32 as projected along light pipe 28, where the infrared light is internally reflected by the aluminized surface of light pipe 28 until it is emitted by way of a branch 34 and aperture 38 through the wall 37 of housing 12 as a discrete infrared beam 39. Each infrared beam 39 proceeds in a direction perpendicular to wall 37, passing through liquid crystal display 20 in one of regions 50 of the liquid crystal display.

Transparent projections 49 extend inwardly from ridge 44 a short distance and typically define part of the path of each beam 39. They facilitate the mounting of display module 10 by insert molding into a larger casing of a machine or the like.

Regions 50 of liquid crystal display 20 may be electronically controlled to be either opaque or transparent in accordance with liquid crystal display principles. If the given region 50 through which a given beam 39 is directed is opaque, then the beam effectively terminates there. If the region 50 is transparent, then beam 39 continues upwardly through frame member 40 to be reflected by ridge 44.

Beam 39 is turned by typically 90 degrees to pass outside of frame 40 adjacent to and parallel to the plane of plastic sheet 42, until beam 39 engages an opposite ridge 44 at which point it is angled downwardly again by essentially 90 degrees toward liquid crystal display 20.

Liquid crystal display 20 defines further regions 52 (FIG. 7) which, like regions 50, are also electronically controllable to be transparent or opaque. Generally, corresponding regions 50, 52 for the same beam are typically simultaneously transparent and simultaneously opaque, as governed by the electronics of the system. If the beam 39 reaches a region 52 and finds it opaque, the beam is effectively terminated. If region 52 is transparent, beam 39 passes through liquid crystal display 20 downwardly into second light pipe 30, (FIG. 3) which is preferably essentially identical in construction to first light pipe 28. That is to say, second light pipe 30 defines a series of branches 34a which are functional prisms, each branch 34a being positioned to receive a separate, discrete light beam 39. Light pipe 30 may also be externally coated with aluminum to promote internal reflection of light beams 39 entering therein through a branch 34a.

At the end of light pipe 30 is an infrared receptor 56 which is electrically connected to a suitable microprocessor or other electronic circuitry that serves as a timing and control means.

In a manner similar to that described in the previously cited U.S. Pat. No. 4,847,606, a microprocessor can cause sequential gating of the respective pairs of liquid crystal display portions 50, 52, so that only a single pair of the portions 50, 52 on the liquid crystal display 20 are transparent, with the remaining portions 50, 52 being rendered opaque to prevent transmission of a light beam 39. Thus, typically, over a period of a few milliseconds, differing light beams 39 are created and terminated in a sequential manner.

The microprocessor (and other electronic hardware) monitors such timing, and also monitors signals received from infrared sensor 56, correlating them with the timing. In the event that a signal from sensor 56 is not received at a time when a given beam 39 should be passing through the system, this absence is noted by the circuitry and interpreted as a positive actuation of the switch of this invention.

Thus, referring to FIG. 1, when a user places his finger in any of the rows numbered 1, 4, 7, 10, etc. through 28 shown in FIG. 1, one of the beams 39 is occluded as such beam is sequentially created over a cycle in which each beam is created and terminated in a period of just a few milliseconds, by rendering transparent and then opaque sequential pairs of liquid crystal display portions 50, 52. If, for example, the beam 39 particularly shown in FIG. 1 is occluded, then, at the expected time, sensor 56 fails to sense the beam. The electronics are thus actuated to take a specific action as governed by the software.

This specific apparatus of FIG. 1 provides a multiplication of the amount of choice available in the switch-like liquid crystal display module of this invention. As shown, three infrared emitters 60 are provided, being adapted for directional emission of infrared beams 62 from each emitter 60 to a corresponding infrared receptor 64 adjacent the other end of the liquid crystal display, with beams 62 being transversely related to beams 39 in crossing manner. If desired, infrared emitters 60 may be provided which emit a beam directly outwardly from the liquid crystal display module, with frame member 40 being of a sufficient length to overlie both infrared emitters 60 and receptors 64. Appropriate ridge reflectors analogous to ridge 44 are then provided to direct their respective beams 62 toward receptors 64 in a path, utilizing two 90 degree bends. Specifically, extensions of ridge 44 are used. Either way, beams 62 are traveling outside of frame 40 so that they can be occluded by a finger or other object.

For example, as specifically illustrated in FIG. 1, the beams 39, 62 specifically shown cross at area 4, which is part of the background display of the liquid crystal display plate 20 created by the electronics of the system and back lit as desired by fluorescent lights 22, 24. In this embodiment, the respective beams 62 do not need to be intermittent and sequential since each of the beams is directed from a separate emitter 60 to a separate receptor 64.

Accordingly, when one places a finger on area 4, both of the specific beams 39, 62 shown in FIG. 1 are occluded. Through the electronics of this system, a specific electronic response can be elicited by such touching of area 4 which is distinct from and different from touching any of the other areas. In fact, each of the areas 1 through 30 correspondingly cause the occlusion of differing beams, and thus can be used to create thirty different electronic outcomes by simply touching with the finger any of the thirty-three marked areas.

Three more areas (called cells), shown as areas 31, 32 and 33, can also be selected since if light beam 62 is occluded, but beam 39 is not. Thus the finger must be positioned in area 31.

Placing the finger, therefore, in any of the areas 1 through 33 can result in a specific action as governed by the software. For example, the resulting action could be the selection of the floor for an automatic elevator, the selection of a number, the selection of a specific course of action for an electronic instrument, a washing machine, an automobile, a telephone, or the like.

Thus, the liquid crystal display module of this invention serves as a switch which can be provided with a wide ranging and flexible degree of selectivity. The specific matrix of numbers shown on the liquid crystal display in FIG. 1 can of course change to another at any moment in accordance with the software, with accompanying instructions displayed on the liquid crystal display if desired.

The above has been offered for illustrative purposes only, and is not intended to limit the scope of the invention of this application, which is as defined in the claims below.

That which is claimed is:

1. A liquid crystal display module which comprises:

a liquid crystal display;

a housing of essentially C-shaped cross section, said liquid crystal display being attached to opposed ends of the C-shaped cross section of said housing;

electronic control means positioned on said housing, a least some of said electronic control means being carried on the side of the said housing which is opposed to said liquid crystal display; and conductor means carried by said housing and providing electronic communication between said electronic control means and said liquid crystal display, at least part of said conductor means extending about an outer, curved surface portion of said housing defined by said C-shaped cross section.

2. The display module of claim 1 in which said conductor means comprises at least in part conductive, printed circuit lines adhering to said housing.

3. The display module of claim 1 in which said housing carries, within said C-shaped cross section, a light source comprising at least one light bulb to provide back illumination of said liquid crystal display.

4. The liquid crystal display module of claim 1 in which said C-shaped housing is made of plastic extruded in said C-shaped cross-section.

5. The liquid crystal display module of claim 1 in which said housing is substantially rigid, to provide protection and support to said liquid crystal display.

6. The liquid crystal display module of claim 1 in which said conductor means and liquid crystal display are electrically connected with an electrically conductive adhesive.

7. The liquid crystal display module of claim 1 in which said C-shaped housing defines a projection on an edge of said housing that extends parallel to said C-shaped cross section, some of said conductor means being carried on said projection, to define an edge connector for connection of said conductor means and liquid crystal display to other circuitry.

8. A liquid crystal display module which comprises:

a liquid crystal display;

a housing;

conductor means carried by said housing and providing electronic communication between electronic control means and said liquid crystal display;

a pair of light pipes respectively positioned adjacent opposed edges of said housing, a first of said light pipes being connected to a source of light and the other of said light pipes being connected to a sensor for said light, said light pipes each defining a plurality of spaced branches positioned whereby a plurality of spaced light beams can be emitted from the branches of said first light pipe, and can pass through said liquid crystal display, and can be received by the other light pipe through the branches thereof to be sensed by said sensor; said electronic control means being capable of sequentially and transiently forming transparent and opaque windows in said liquid crystal display at positions where said spaced light beams pass through said liquid crystal display; and timer and logic means for correlating a signal received from said sensor with the individual light beam that creates said signal, whereby occlusion of at least one of said spaced light beams with an opaque member causes a specific, characteristic response by said timer and logic means.

9. The module of claim 8 in which said light pipes are substantially covered with an internally reflective surface except at ends of said spaced branches.

10. The module of claim 8 in which said branches are positioned to direct light beams transversely of said liquid crystal display.

11. The module of claim 10 in which a transparent plate is carried on the side of said liquid crystal display opposite to that of said light pipes, said transparent plate carrying pairs of spaced 90° reflector members positioned to direct each said spaced light beam from the first light pipe through two angled reflections along a light path that enters a respective branch of said other light pipe, said reflector members directing said spaced light beams along paths that extend outside of said plate to permit occlusion thereof.

12. The module of claim 8 in which said source of light emits infrared light.

13. The module of claim 8 including a second light source comprising at least one light bulb to provide back illumination of said liquid crystal display, said second light source providing a different type of light from the light provided to said light pipes, said sensor being insensitive to said different type of light, said different type of light being a visible light.

14. The module of claim 8 in which added light emitter and receptor means, connected to said timer and logic means, are provided to emit and receive at least one second light beam that crosses said spaced light beams in a position permitting simultaneous occlusion of both a spaced light beam and a second light beam with said opaque member, to provide two dimensional location of said opaque member.

15. The module of claim 8 in which said housing is of essentially C-shaped cross section, said liquid crystal display being attached to opposed ends of the C-shaped cross section of the housing.

16. A liquid crystal display module which comprises:

a liquid crystal display;

a housing of essentially C-shaped cross section, said liquid crystal display being attached to opposed ends of the C-shaped cross section of the housing;

conductor means carried by said housing and providing electronic communication between electronic control means and said liquid crystal display;

a pair of light pipes respectively positioned adjacent opposed edges of said housing, a first of said light pipes being connected to a first source of light and the other of said light pipes being connected to a sensor for said light, said light pipes each defining a plurality of spaced branches positioned whereby a plurality of spaced light beams can be emitted from the branches of said first light pipe and can pass through said liquid crystal display, and can be received by the other light pipe through the branches thereof to be sensed by said sensor;

said control means being capable of sequentially and transiently forming transparent and opaque windows in said liquid crystal display at positions where said spaced light beams pass through said liquid crystal display;

timer and logic means for correlating a signal received from said sensor with the individual light beam that creates said signal, whereby occlusion of at least one of said spaced light beams with an opaque member causes a specific, characteristic response by said timer and logic means;

and a second light source comprising at least one light bulb to provide back illumination of said liquid crystal display, said second light source providing a different type of light from the light provided to the light pipes, said sensor being insensitive to said different type of light, said different type of light being a visible light.

17. The module of claim 16 in which said branches are positioned to direct light beams transversely of said liquid crystal display, and in which a transparent plate is carried on the side of said liquid crystal display opposite to that of said light pipes, said transparent plate carrying a pair of spaced 90 degree reflector members positioned to direct each of said spaced light beam from the first light pipe through two angled reflections along a light path that enters a respective branch of said other light pipe, said reflector members directing said spaced light beams along said paths outside of said plate to permit occlusion thereof.

18. The module of claim 17 in which said first source of light emits infrared light.

19. The module of claim 16 in which at least some of said electronic control means is carried on the side of said C-shaped housing which is opposed to said liquid crystal display, at least part of said conductor means extending about an outer, curved surface portion of said housing defined by said C-shaped cross section.

20. The display module of claim 19 in which said conductor means comprises at least in part conductive, printed circuit lines adhering to said housing, said conductor means and liquid crystal display being electrically connected with an electrically conductive adhesive.

21. A liquid crystal display module which comprises:

a liquid crystal display;

a housing of essentially C-shaped cross section, said liquid crystal display being attached to opposed ends of the C-shaped cross section of said housing;

electronic control means positioned on said housing;

conductor means carried by said housing and providing electronic communication between said electronic control means and said liquid crystal display, at least some of said electronic control means being carried on the side of said housing which is opposed to said liquid crystal display, at least part of said conductor means extending about an outer, curved surface portion of said housing defined by said C-shaped cross section;

and said housing carrying, within said C-shaped cross section, a light source comprising at least one light bulb to provide back illumination of said liquid crystal display.

22. The display module of claim 21 in which said conductor means comprises at least in part conductive, printed circuit lines adhering to said housing.

23. The liquid crystal display module of claim 22 in which said C-shaped housing is made of plastic extruded in said C-shaped cross section.

24. The liquid crystal display module of claim 23 in which said conductor means and liquid crystal display are electrically connected with an electrically conductive adhesive.

* * * * *